United States Patent [19]

Rose

[11] Patent Number: 4,712,944

[45] Date of Patent: Dec. 15, 1987

[54] SEA WAVE DISSIPATOR APPARATUS AND METHOD FOR ITS MANUFACTURE

[76] Inventor: Leo J. Rose, 16 S. Pendleton Ct., Frederick, Md. 21701

[21] Appl. No.: 924,575

[22] Filed: Oct. 29, 1986

Related U.S. Application Data

[63] Continuation of Ser. No. 334,514, Dec. 30, 1981.

[51] Int. Cl.⁴ .............................................. E02B 3/06
[52] U.S. Cl. ...................................... 405/26; 405/21; 405/28
[58] Field of Search .................................. 405/21–25, 405/28–35

[56] References Cited

U.S. PATENT DOCUMENTS

| | | | |
|---|---|---|---|
| 226,663 | 4/1880 | Kirkup | 405/26 |
| 1,004,718 | 10/1911 | Wieland | 405/26 |
| 3,691,774 | 9/1972 | Hard | 405/26 |
| 3,791,150 | 2/1974 | Tachii | 405/27 |
| 3,849,807 | 11/1974 | Lowe | 405/26 X |
| 3,864,920 | 2/1975 | Tazaki et al. | 405/27 |
| 3,886,602 | 6/1975 | Stanwood | 405/27 X |
| 4,027,486 | 6/1977 | Dougherty | 405/26 |
| 4,234,266 | 11/1980 | Angioletti | 405/26 |

Primary Examiner—Dennis L. Taylor

[57] ABSTRACT

A plurality of inflatable and floatable buoyant members uniquely configured and connected on slack lines adaptable to yielding to high tide and storm conditions and in which the lines are secured to anchor members, the members being hollow for receiving a fluid such as water of air, or both, and check valves for locking of closing off the fluid flow as desired. By positioning the buoyant members in the path of sea waves and by minute adjustments of buoyancy, maximizing of dissipation of the waves is achieved.

8 Claims, 9 Drawing Figures

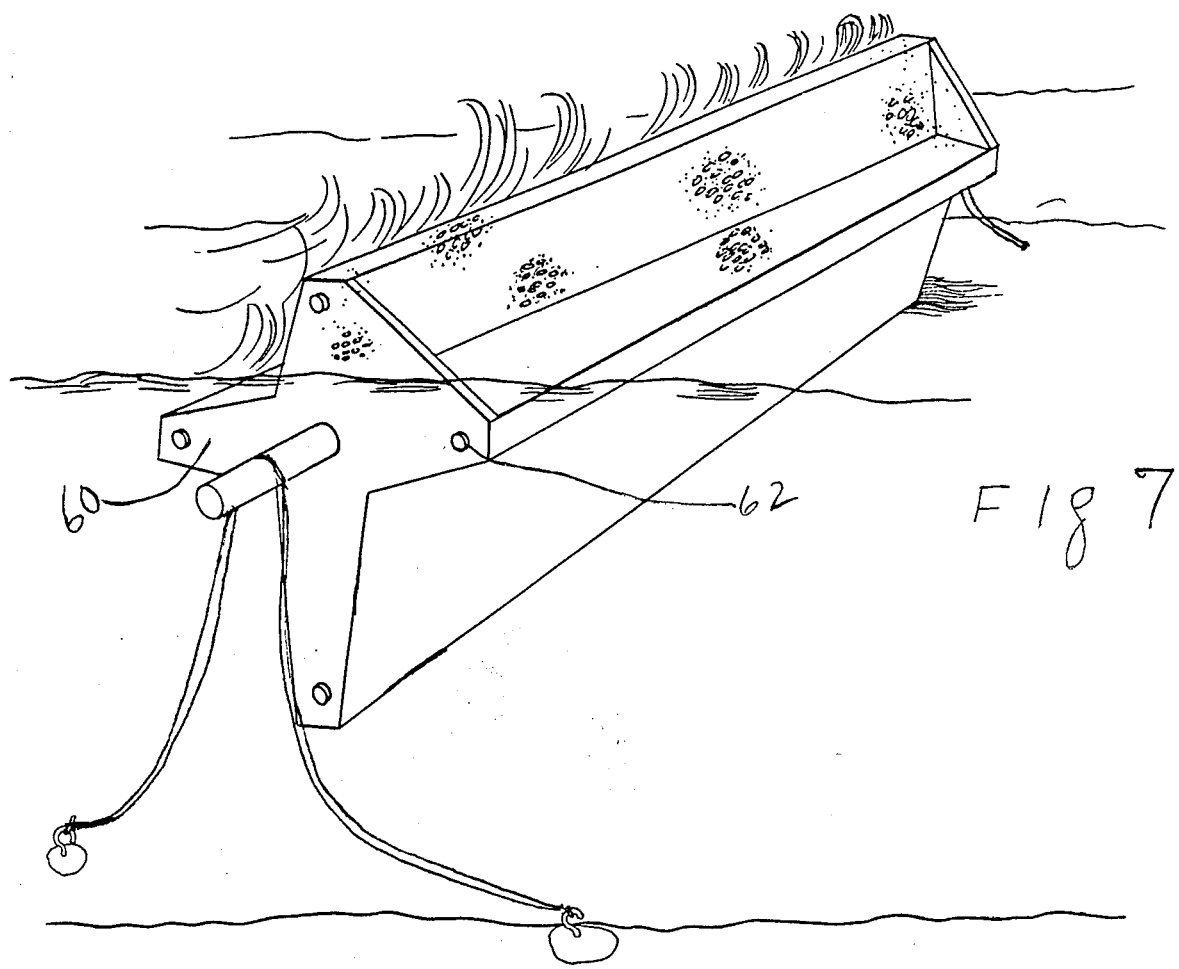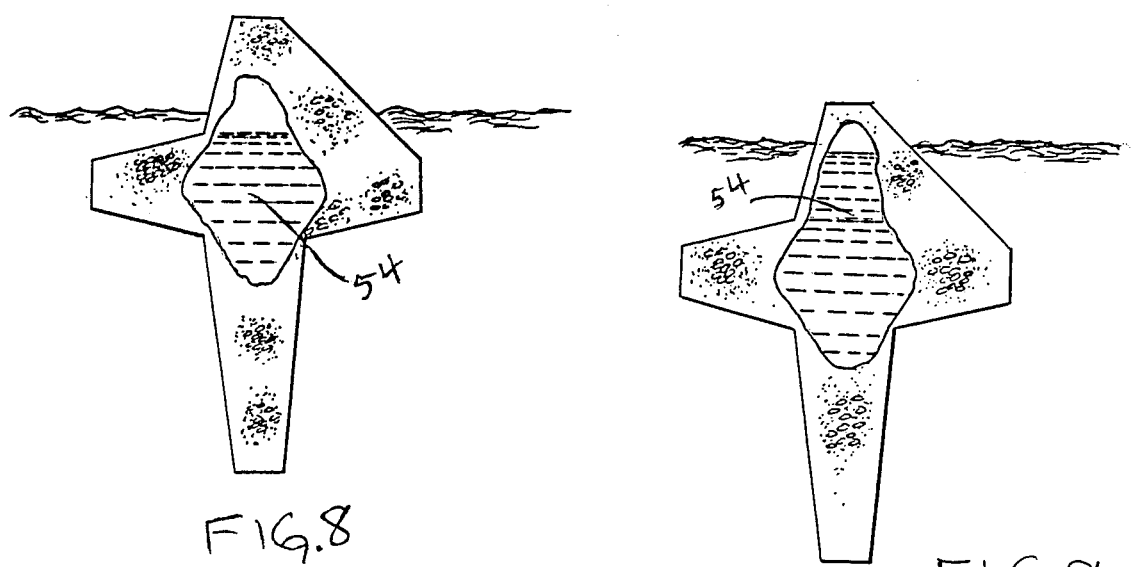

SEA WAVE DISSIPATOR APPARATUS AND METHOD FOR ITS MANUFACTURE

CROSS-REFERENCE TO RELATED PRIOR ART

This application is a related and continuing application to my application Ser. No. 334,514 filed Dec. 30, 1981.

BACKGROUND OF THE INVENTION

1. Field of the Invention

The present invention relates to an improved apparatus and method for achieving dissipation of sea wave energies and forces, and more particularly the invention is seen to relate to an arrangement of apparatus that is selectively disposed to interfere with and breakup an oncoming sea wave form front with floatable or inflatable apparatus and having fluid check valves for selectively passing or retaining fluids within buoyant members.

An existant need has been long found present that requires reducing, eliminating and modulating the force of sea wave form fronts that cause erosion and beach shifting of sands, gravel and the like.

For years and as is well known in the present time frame, natural rocks, pilings and some artificial efforts are found to modify the effect of erosion and sand drifting on ocean beaches, some beaches of the Great Lakes and beaches on sea coasts.

Other types of breakwater elements are found to require upkeep, management or maintenance, yet are not available such that they can be selectively unused in summer and under non-storm conditions where it is found allowable to sink buoys until the winter or storm-condition seasons, so that beaches are allowed to have waves of good significance during the resort season, and then, upon anticipation of storms, inclement weather, and seasonal hurricanes, selectively raise the buoys until the winter or storm-condition cease.

By use of a plurality of selectively buoyant members facing a wave front and impacting with the energy thereof, it is seen that advantageous results are attained not previously known or otherwise contemplated in any of the prior and background prior art.

The invention relates further to a device providing for the use of the floating sea wave dissipator apparatus during certain seasons and sinking it during more severe and non-use seasons and the method of the manufacture thereof as more particularly described herein.

2. Description of the Prior Art

Various prior art sea wave dissipator apparatus or devices, and the like, as well as apparatus and method of their construction in general, are found to be known and exemplary of the prior art are the following U.S. Pat. Nos. 3,494,132, Logan; 3,640,075, LaPeyre; 3,691,774, Hard; 3,703,811, Smith; 3,757,527, Keller; 3,863,455, Fuller; 4,027,486, Dougherty; 4,048,802, Bowley; 4,104,424, Bretherick; 4,172,680, Brown; 4,234,266, Angioletti; 4,244,819, Ballu; and U.K. Pat. No. 2,068,300, Ashworth.

These patents relate to means of vigorously absorbing or reducing wave effects and LaPeyre shows a pump in a concrete form.

These patents or known prior uses teach and disclose various types of sea wave dissipator apparatus or devices of sorts and of various manufactures and the like as well as methods of their construction, but none of them whether taken singly or in combination disclose the specific details of the combination of the invention in such a way as to bear upon the claims of the present invention.

SUMMARY OF THE INVENTION

It is an object, advantage and feature of the present invention to provide an arrangement for selectively inflating, or exausting the medium in a water-filled sea wave dissipator and filling it with air, so the sea wave dissipator is in a buoyant condition and then sinking it for resting on the sea floor.

It is a further object of the invention to provide a chain or plurality of buoyant members for impeding a full force of sea waves and the impact of a wave front upon a beach or shore or resort area having boats or the like; more particularly it is an advantage and feature of the invention to allow selective uses of a sea wave dissipator apparatus and its method of manufacture and use.

Another object of the invention is to provide a sea wave energy absorbing or energy dissipator for causing when inn selective use a full damping of waves with a simplistic, compact and inexpensive system of floatable or inflatable buoyant elements that selectively may be sunk for allowing a full impact on the beach of the waves and wave energy such as during the resort season.

Another feature of the invention is to provide a breakwater device whereby the height and energy of the wave front and its energy impact is selectively reduced and adjusted so that the buoyant members can be selectively raised or lowered a small amount of vertical distance to place the buoyant members right into the full impact zone of the sea wave fronts.

The wave energy impacting members may be adjustably disposed within the desired height of the oncoming wave for clipping a lower ground swell, or clipping a mid section of a vertical component of an oncoming wave or for reaching the top segment of the wave, as may be desired.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

DESCRIPTION OF THE SEVERAL VIEWS OF THE DRAWINGS

FIG. 7 is a generally perspective view of a buoyant member of a similar configuration; FIG. 8 shows a section view of a buoyant member partially water-filled; and FIG. 9 is a sectional view of asimilar buoyant member of which the buoyant member is nearly fully water-filled.

DESCRIPTION OF A PREFERRED EMBODIMENT OF THE INVENTION

Figure 1:
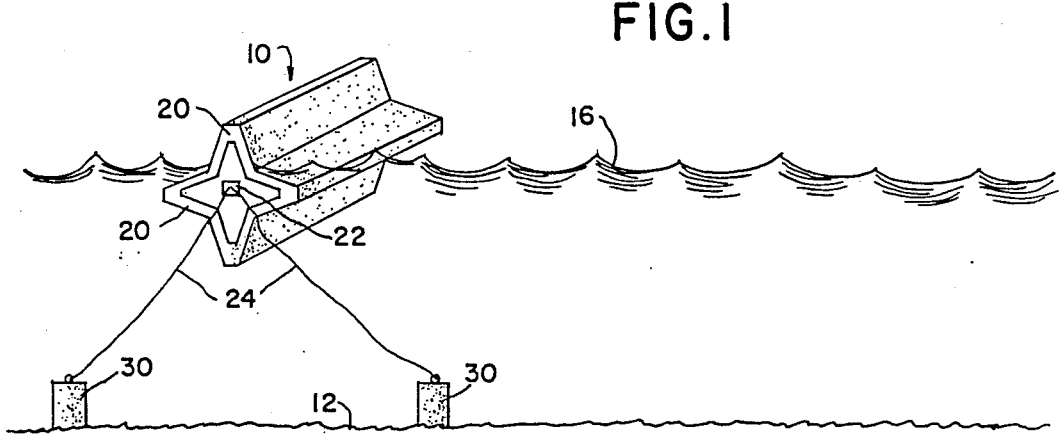
FIG. 1 is a perspective view partly in section showing underwater terminus for supporting or mooring an inflatable or floatable buoyant member and illustrating a typical installation of the sea wave dissipator according to a preferred embodiment and best mode of practicing the present invention.
Figure 2:
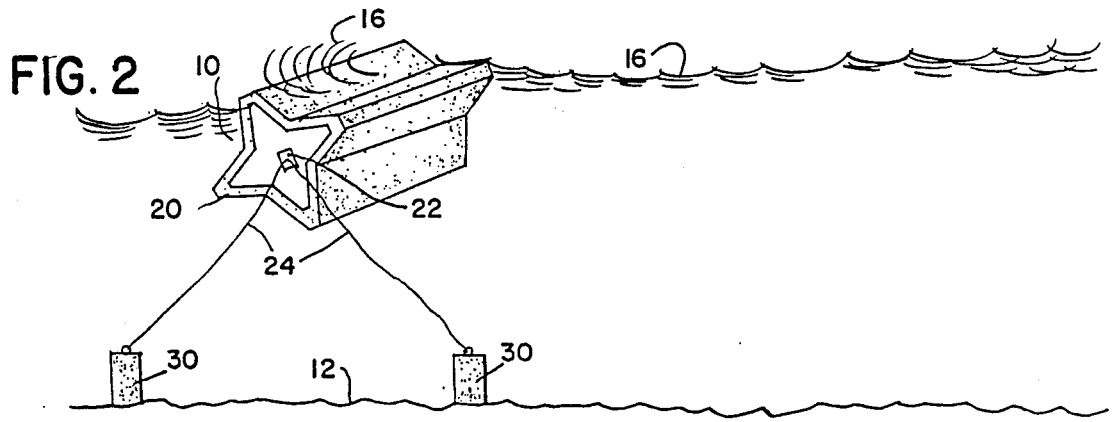
FIG. 2 is a perspective view similar to FIG. 1 showing how the buoyant member of the invention provides dissipation of sea waves during use and embodying the concepts of the invention.
Figure 3:
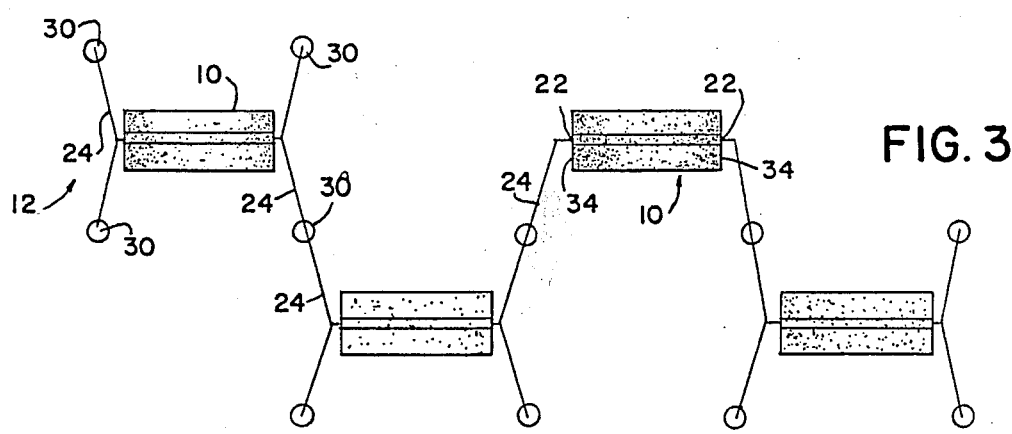
FIG. 3 shows in plain view how a plurality of buoyant members are pr may be arranged to accomodate a full impaction of sea waves while in use.

Referring now to the drawings there is shown new and improved sea wave dissipators 10 placed on a beach or shore line 12 so that as breakers or waves 16 come about to impact upon a given shore line12, waves 16 may be caused to break up in dissipation of their energy upon the dissipators 10. Each of the dissipators may be made, constructed and arranged to possess a thin wall 20 of cementitious material, concrete or the like and having rotatable coupler units 22 to which are connected tie lines, securing lines or mooring lines 24 in which the other ends are terminated at anchors 30 as shown in FIGS. 1-4 inclusive.

Figure 4:
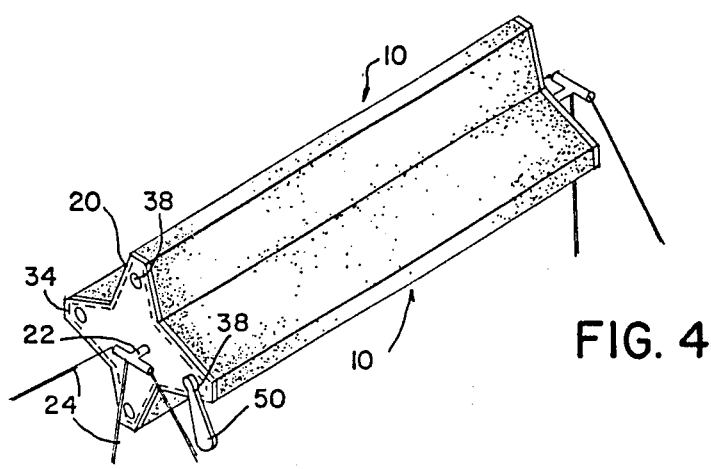
FIG. 4 shows in enlarged perspective view how end coupling elements and fluid check valves may be installed or mounted upon end faces or walls of the buoyant members.

In FIG. 4 there is shown an end face 34 of an inflatable or floatable and buoyant member or dissipators 10 such that it conforms throughout its entirety to a geometrical configuration, such as a star shape, or the like, of the buoyant member and which is provided to possess a set of several fluid check valves 38 for fluid ingress, egress or either as may be selected, a flow of air and water that may be desired to fill the dissipators 10. Conventional type of quick connect-disconnect coupling devices may be provided for ensuring coupling for fluid hose members for ingress or egress of air and for exhaustion of water to the sea environment, as desired.

Tidal changes do not interfere or affect the arrangement of dissipators 10 under ordinary conditions because slack is required in the lines for a recession from conditions of high tide in low tide.

By the method and apparatus of the invention minute adjustments are achieved throughout the system of buoyant dissipators 10 so that maximazation of wave dissipation is achieved.

Flexible plastic lines 50 for conducting air, for example, to a unidirectional flow check valve 38 may be provided for remotely applying or supplying pressurized air to the dissipators 10 as desired.

FIGS. 5-9 are exemplarly in that a buoyant dissipator 50 is shown utilizing various amounts of sea-water filler 54.

Figure 5:
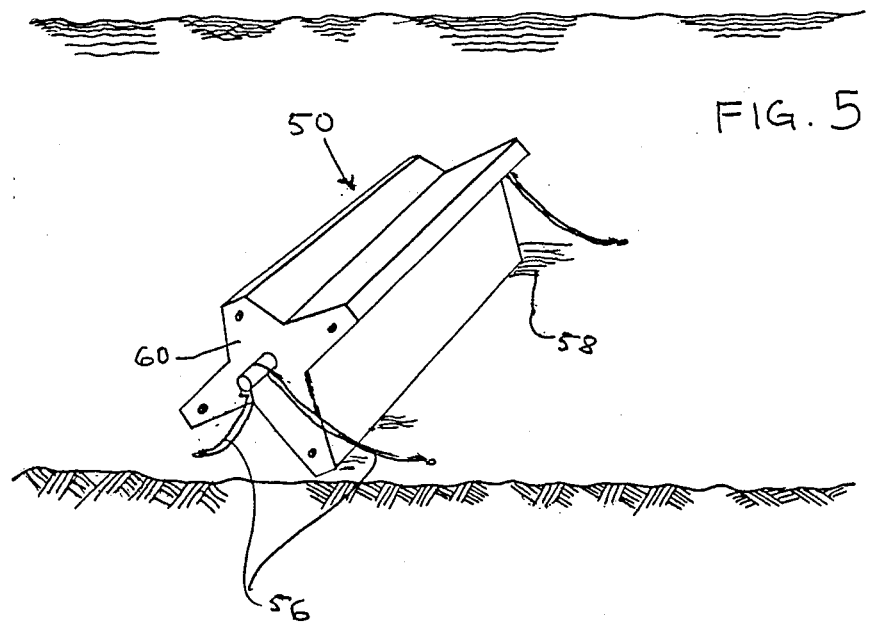
FIG. 5 illustrates a typical buoyant member as shown in FIGS. 1-4 in which the buoyant member is water filled and sunk to rest on the sea bottom.
Figure 6:
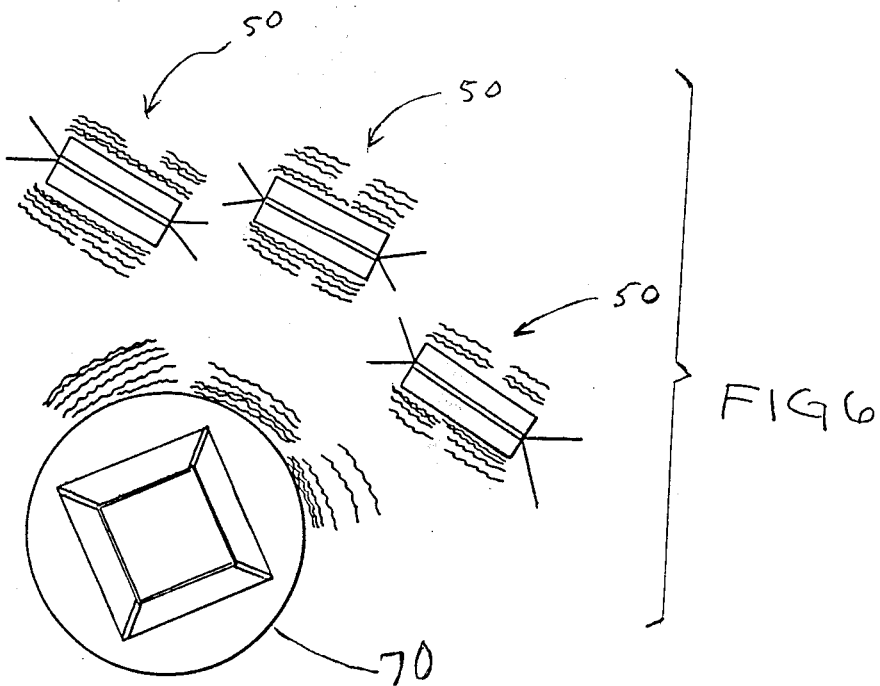
FIG. 6 is a plan view of an arrangement of a typical buoyant members protecting a platform not part of the invention.

The buoyant dissipator 50 and the dissipators 10 are shown illustrated as star shaped and hollow for infilling with sea water 54. FIG. 5 illustrates further the buoyant dissipator 50 filled with sea water and being sunk for resting on the sea bottom. Periods of resting the dissipator 50 on the sea bottom may be seasonal such as during times of fair weather or winter conditions. The sea water contents is pumped out for raising the buoyant dissipator 50 as disclosed with dissipators 10.

FIGS. 5 and 7 show the mooring lines 56 in slacked condition. Lines 56 of course are very slacked when the dissipators 10, 50 rest on the sea bottom 58 of FIG. 5.

End wall 20 of FIGS. 1-4 and end wall member 60 are secured in place by members 62. Buoyancy is regulated by the amount of sea water 54 allowed to fill and enter the chamber internal of the buoyant dissipator 50. The buoyant dissipators 10, 50 are illustrated distributed about a platform 70 stabilized on the sea bottom 58. FIGS. 8 and 9 illustrate that various levels of buoyancy are achieved by the determination of sea water to fill in the interior of the chamber.

Upon initial installation, the member is floated into position devoid of water with all flow check valves closed. When the member is in a desired position, both top most and bottom most check valves are opened to allow intake water. When the desired level of buoyancy is reached, all flow check valves are closed to allow the water level and buoyancy to remain constant. To refloat the members which have been allowed to sink to the bottom or floor of the water or sea or ocean for whatever purpose deemed necessary by the user, then compressed air or other gas is introduced into the members via the top most flow check valve. The bottom most flow check valve is opened to permit discharge of water under pressure of the air. The water is replaced by the compressed air, thus introducing buoyancy to the members so that they will surface at a predetermined level. When the desired level of buoyancy has been achieved, the bottom most flow check valve is closed. The compressed air line which fed the top most flow check valve is removed and the check valve is closed.

The apparatus of the dissipators 10,50 of the invention may be so constructed and arranged in its component parts that it may be assembled as a kit or in kit form.

The foregoing is considered as illustrative only of the principles of the invention. Further, since numerous modifications and changes will readily occur to those skilled in the art it is not desired to limit the invention to the exact construction and operation shown and described, and accordingly, all suitable modifications and equivalents may be resorted to falling within the scope of the invention.

What is claimed and desired to be secured by Letters Patent is:

1. Improved sea wave dissipator systems comprising
    a plurality of floatable buoyant members constructed of a rigid material,
    each of the members having a generally star shaped geometric outer sectional configuration being symmetrically disposed about a vertical plane with a portion forming a substantially horizontal portion thereof disposed for engagingly receiving an oncoming sea wave form front,
    end elements constructed integrally with the members and having a central coupling unit mounted proximate a horizontal axis of the members,
    an integral component of the members having an integrally depending ballast portion defined as a generally hollow interior configuration and disposed below a surface of sea waves,
    each of the members having the generally star shaped geometric outer sectional configuration related to the generally hollow interior configuration as is the outer sectional configuration,
    the central coupling units being axially rotatable about the horizontal axis of the members,
    anchor means positioned on each side of the vertical plane and deposited on the sea floor for retaining the buoyant members in a generally stationary relative position when the buoyant members are disposed in a floating relation, line members extending between the central coupling units and the anchor means, a plurality of distally arranged air and water fluid check valves disposed and mounted in the end elements and adapted to be adjusted to selectively pass or retain fluid within the members, the members, when it is desired to raise them from a bottom and lowered position in water, then being coupled by a series of air supply lines for augmenting the air supply within the plurality of members, and lines and unidirectional flow check valve means being provided for remotely supplying of pressurized air fluid to the members.

2. The invention of claim 1 wherein the rigid material is a cementitous material.

3. The invention of claim 1 wherein each of the plurality of members are alternatively disposed about a straight line of asymmetry defined generally as midpoints positioned between adjacent ones of the members and so connected to form the line of asymmetry.

4. The invention of claim 1 wherein the members while positioned in situ provide for sea wave dissipation found present on either side of the vertical plane.

5. The invention of claim 1 wherein the lines and the unidirectional flow check valves provide for remote supply of pressurized air fluid to the members are mounted remotely of the members.

6. Method of constructing an improved sea wave dissipator systems in a process of constructing and arranging the system according to claim 1 comprising constructing a plurality of floatable buoyant members of a rigid material, each of the members having a star shaped geometric outer sectional configuration with a portion forming a substantially horizontal portion thereof disposed for engagingly receiving an oncoming sea wave form front with an integral component of the member as depending ballast below a surface of the sea wave, each of the members having the star shaped geometric outer sectional configuration symmetrically disposed and related to a generally hollow interior configuration as is the outer sectional configuration, constructing end elements integrally with the members having a central coupling unit mounted proximate an axis of the member, and positioning a plurality of distally arranged air and water fluid check valves disposed in the end elements adjusted to selectively pass or retain fluid within the members.

7. The method of claim 6 wherein the material is cementitous.

8. The invention of claim 1 wherein the member is inflatable by air or gaseous fluid introduced into the hollow interior of the members.

* * * * *